United States Patent
Cox

(10) Patent No.: US 7,419,022 B2
(45) Date of Patent: Sep. 2, 2008

(54) THERMIONIC POWER UNIT

(75) Inventor: Isaiah Watas Cox, London (GB)

(73) Assignee: Borealis Technical Limited, Gibraltar ( * ) Notice: Subject to any disclaimer, the term of this patent is extended or adjusted under 35 U.S.C. 154(b) by 991 days.

(21) Appl. No.: 10/719,446

(22) Filed: Nov. 21, 2003

(65) Prior Publication Data

US 2004/0099304 A1    May 27, 2004

Related U.S. Application Data

(63) Continuation-in-part of application No. 09/828,646, filed on Apr. 5, 2001, now Pat. No. 6,651,760.

(60) Provisional application No. 60/194,850, filed on Apr. 5, 2000.

(51) Int. Cl.
*B60K 25/00* (2006.01)

(52) U.S. Cl. .................................. 180/65.3; 180/309

(58) Field of Classification Search ............... 280/65.3, 280/65.2, 65.1, 65.4, 309
See application file for complete search history.

(56) References Cited

U.S. PATENT DOCUMENTS

| | | | |
|---|---|---|---|
| 3,173,032 A | | 3/1965 | Maynard |
| 3,992,885 A * | | 11/1976 | Forster .......................... 60/698 |
| 4,097,752 A * | | 6/1978 | Wulf et al. .................... 290/20 |
| 4,148,192 A * | | 4/1979 | Cummings .................... 60/716 |
| 4,199,713 A * | | 4/1980 | Forster .......................... 322/2 R |
| 5,235,803 A | | 8/1993 | Rodgers |
| 5,323,737 A * | | 6/1994 | Farrell ......................... 123/18 A |
| 5,625,245 A * | | 4/1997 | Bass ............................ 310/306 |
| 5,699,772 A * | | 12/1997 | Yonekawa et al. ........... 123/497 |
| 6,054,837 A * | | 4/2000 | Edelson ....................... 318/801 |
| 6,166,317 A * | | 12/2000 | Volk, Jr. ..................... 136/201 |
| 6,175,217 B1 * | | 1/2001 | Da Ponte et al. ............ 322/19 |
| 6,192,687 B1 * | | 2/2001 | Pinkerton et al. ............ 60/646 |
| 6,229,083 B1 * | | 5/2001 | Edelson ....................... 136/201 |
| 6,271,614 B1 | | 8/2001 | Arnold |
| 6,272,873 B1 * | | 8/2001 | Bass ........................... 62/238.3 |
| 6,651,760 B2 | | 11/2003 | Cox et al. |
| 7,260,939 B2 * | | 8/2007 | Weaver, Jr. .................. 62/3.1 |

FOREIGN PATENT DOCUMENTS

| | | |
|---|---|---|
| JP | 10-238406 | 8/1998 |
| WO | WO-99/40628 A1 | 8/1999 |

* cited by examiner

*Primary Examiner*—Christopher Ellis
*Assistant Examiner*—John D Walters

(57) ABSTRACT

It is the principal object of the invention to provide a new and improved electrical power unit for use in automobiles, on aircraft, or for local generation of electrical power. In one embodiment of the present invention, an electrical power unit comprises: a combustion chamber that burns fuel to produce heat energy; and a thermionic device that converts the heat energy into electrical energy. In another embodiment of the present invention, the electrical power unit additionally comprises an electric motor. In a further embodiment, the electrical power unit additionally comprises an electrically power air compressor, an electrically power hydraulic compressor, and an electrical power conditioning unit.

29 Claims, 3 Drawing Sheets

THERMIONIC POWER UNIT

CROSS-REFERENCE TO RELATED APPLICATIONS

This application is a continuation in part of U.S. application Ser. No. 09/828,646, filed 5 Apr. 2001 now U.S. Pat. No. 6,651,760, which claims the benefit of U.S. Provisional Application No. 60/194,850 filed Apr. 5, 2000.

BACKGROUND OF THE INVENTION

Thermionic devices, such as thermionic converters, which transform input heat to electricity, are known in the art. A number of thermionic converters comprise low work function electrodes that convert heat energy to electrical energy with enhanced efficiency. Thermotunneling converters are also known to the art.

In WO99/13562 Tavkhelidze and Edelson disclose diode devices in which the separation of the electrodes is set and controlled using piezo-electric, electrostrictive, or magnetostrictive actuators. This avoids problems associated with electrode spacing changing or distorting as a result of heat stress. In addition it allows the operation of these devices at electrode separations which permit quantum electron tunneling between them. Pairs of electrodes whose surfaces replicate each other are also disclosed. These may be used in constructing devices with very close electrode spacings, including thermionic and thermotunelling converters.

In U.S. Pat. No. 6,281,514 to Tavkhelidze, a method for promoting the passage of elementary particles at or through a potential barrier comprising providing a potential barrier having a geometrical shape for causing de Broglie interference between said elementary particles is disclosed. In another embodiment, the invention provides an elementary particle-emitting surface having a series of indents. The depth of the indents is chosen so that the probability wave of the elementary particle reflected from the bottom of the indent interferes destructively with the probability wave of the elementary particle reflected from the surface. This results in the increase of tunneling through the potential barrier. When the elementary particle is an electron, then electrons tunnel through the potential barrier, thereby leading to a reduction in the effective work function of the surface. In further embodiments, the invention provides vacuum diode devices, including a vacuum diode heat pump, a thermionic converter and a photoelectric converter, in which either or both of the electrodes in these devices utilize said elementary particle-emitting surface. In yet further embodiments, the invention provides devices in which the separation of the surfaces in such devices is controlled by piezo-electric positioning elements. A further embodiment provides a method for making an elementary particle-emitting surface having a series of indents.

The internal combustion engines used in automobiles convert the expansive energy of combusted fuel into pressure and the pressure into motive power for the vehicle. This process has a number of inefficiencies. For example, it is an inefficient use of fuel, as a substantial amount of heat liberated from the fuel is wasted. Furthermore, these engines work by driving pistons up and down. This not only leads to frictional losses, but also creates unwanted vibration: many designs are expressly created to disguise these vibrations. The internal combustion engine is also noisy, and this is especially so in large vehicles such as trucks and locomotives. Moreover, the frictional forces between the components of the internal combustion engine cause considerable wear and tear on the engine, and shorten the lifetime of the vehicle and of its component parts. Further, many components of vehicles are mechanical, such as power steering, water pumping and fans.

Additionally, when a car is temporarily stopped, idling of the engine wastes energy, is inefficient and noisy, but is necessitated by the nature of internal combustion engine-driven cars.

U.S. Pat. No. 4,148,192 to Cummings discloses an internal combustion electric power hybrid power plant with a number of features. First, it allows the use of a smaller than normal internal combustion engine; the internal combustion engine is selected so as to provide sufficient power for when the vehicle is at cruising speed, and the extra torque needed for acceleration is provided by an electric motor/generator powered by a battery. Secondly, it allows energy to be conserved during braking by the motor/generator, and stored in the battery. Thirdly, one or more thermoelectric converters recover some of the energy in the waste heat from the exhaust, and this is applied to recharge the battery when the vehicle is at cruising speed. Whilst Cummings discloses that this arrangement may be used with a variety of internal combustion engines, including petrol engines, diesel engines, stratified charge engines and gas turbines, it does not overcome the major disadvantages associated with such engines, including noise, low efficiency and pollution.

U.S. Pat. No. 4,097,752 to Wolf et al. discloses an internal combustion engine in which at least one thermionic converter is acted upon by the hot exhaust gases to generate electricity, which is used to power an electric motor. Whilst Wolf et al. teach that this arrangement increases the overall efficiency of an internal combustion engine, it does not avoid the inherent disadvantages of an internal combustion engine iterated above.

U.S. Pat. No. 4,199,713 to Foster discloses an installation for supplying the electric power supply of motor vehicles that includes a generator, a battery as storage device or accumulator and several loads. A thermionic converter of conventional construction, which is operable with the fuel of the motor vehicle, is provided as generator. The electricity generated by the thermionic converter is used to power such ancillary devices as the ignition system, the injection installation, the starter, the light system, the ventilating system, the air conditioning system as well as under certain circumstances also auxiliary apparatus such as, for example, the radio, air-conditioning and the like. This arrangement generates electricity for these ancillary devices when the engine is not running, and also obviates the requirement for an alternator, with concomitant savings. This arrangement does not, however, provide enough electrical energy to propel the car via an electric motor.

Aircraft main engines not only provide thrust for flight and for taxiing but are also called upon to provide energy for running aircraft systems. This includes bleed air, hydraulic power, and electrical power. When the aircraft is on the ground, and high levels of thrust are not required, producing these ancillary services using the main engines consumes large quantities of fuel. To minimize fuel consumption and yet provide the necessary forms of power, so-called auxiliary power units or "APUs" have been deployed on many aircraft.

Demands for hydraulic power, electric power and bleed air may be and frequently are independent of one another. This means that a high demand for one or two forms of energy, say, electrical and hydraulic power, much more bleed air than is required will be generated and the system will dump or spill the excess bleed air which. In addition, gas turbine engines of the type employed in APUs operate most efficiently when operated at a constant speed, which is not necessarily consistent with the demand placed upon them.

The disadvantage of the known auxiliary power units is their relatively poor efficiency, particularly with respect to generating electricity. Their operation is also connected with high exhaust gas and noise emissions.

U.S. Pat. No. 5,235,803 to Rodgers discloses an APU that provides a dual flow, single stage centrifugal compressor by which both bleed air and turbine air may be provided. The objective was to provide, from a single stage centrifugal compressor, relatively low pressure bleed air flow to bleed air system and relatively higher pressure compressed air flow to the turbine combustor.

BRIEF SUMMARY OF THE INVENTION

From the foregoing, it may be appreciated that a need has arisen for a new type of electrical power unit that avoids the disadvantages associated with mechanical systems which rely on the use of expanding gases to move pistons or turn turbines to harness energy from burning fuel.

It is the principal object of the invention to provide a new and improved electrical power unit for use in automobiles, on aircraft, or for local generation of electrical power.

In one embodiment of the present invention, an electrical power plant comprises: a combustion chamber that burns fuel to produce heat energy; a thermionic device that converts the heat energy into electrical energy; and an energy control system. The energy control system takes an input representative of the demand for electrical power and computes and controls the intake of fuel and air into the combustion chamber.

In another embodiment of the present invention, a motive unit comprises: a combustion chamber that burns fuel to produce heat energy; a thermionic device that converts the heat energy into electrical energy; an energy control system; and an electric motor. The energy control system takes an input representative of the demand for electrical power, which correlates to the desired speed of the electric motor and the load on the electric motor, and computes and controls the intake of fuel and air into the combustion chamber.

In a further embodiment of the present invention, an automobile comprises: a combustion chamber that burns fuel and produces heat energy; a thermionic device that converts said heat energy into electrical energy; and an electric motor, wherein said motor converts said electrical energy into rotational energy, wherein said rotational energy provides motive power to said automobile.

In another embodiment of the present invention, an improved system is disclosed which uses thermionic devices to convert combustion heat into electrical power that would in turn power an electric motor, providing a drive means for an electric car.

In another embodiment of the present invention, an auxiliary power unit comprises: a combustion chamber that burns fuel to produce heat energy; a thermionic device that converts the heat energy into electrical energy; an energy control system; and one or more ancillary units. The energy control system takes an input representative of the demand for electrical power from said ancillary units and computes and controls the intake of fuel and air into the combustion chamber. The ancillary units include: a conditioning means to provide electrical energy at the required voltage and frequency; an electrical compressor means powered by the electrical energy for providing bleed air; and an electrical compressor means powered by the electrical energy for providing hydraulic power.

In a further embodiment of the present invention, an aircraft comprises a combustion chamber that burns fuel and produces heat energy; a thermionic device that converts said heat energy into electrical energy; and one or more ancillary units providing one or more services to the aircraft including: a conditioning means to provide electrical energy at the required voltage and frequency; an electrical compressor means powered by the electrical energy for providing bleed air; and an electrical compressor means powered by the electrical energy for providing hydraulic power auxiliary power unit.

A technical advantage of the present invention is an energy efficient, environmentally friendly power plant.

Another technical advantage of the present invention is that an internal combustion engine is not required.

Another technical advantage of the present invention is an energy efficient, environmental friendly automobile. An additional technical advantage of the present invention is that unwanted vibrations due to mechanical movement of parts, such as the reciprocating movement of pistons, is reduced.

A further technical advantage of the present invention is that the engine does not need to idle when output power is not required.

A further technical advantage of the present invention is that the vehicle of the present invention can go from stopped to full speed without the need for elaborate restarting or for an idle state which consumes power.

A still further technical advantage of the present invention is that other vehicle systems, such as hydraulic power steering and braking systems powered from the internal combustion engine, water pumps and oil pumps, and the alternator are not required by the present invention.

An additional technical advantage of the present invention is that the heat energy of combusted fuel provides the motive power, allowing cheaper, healthier, and more easily obtainable fuels.

Other technical advantages of the present invention are set forth in or will be apparent from drawings and the description of the invention that follows, or may be learned from the practice of the invention.

BRIEF DESCRIPTION OF THE SEVERAL VIEWS OF THE DRAWING

For a more complete explanation of the present invention and the technical advantages thereof, reference is now made to the following description and the accompanying drawing in which.

DETAILED DESCRIPTION OF THE INVENTION

Figure 1:
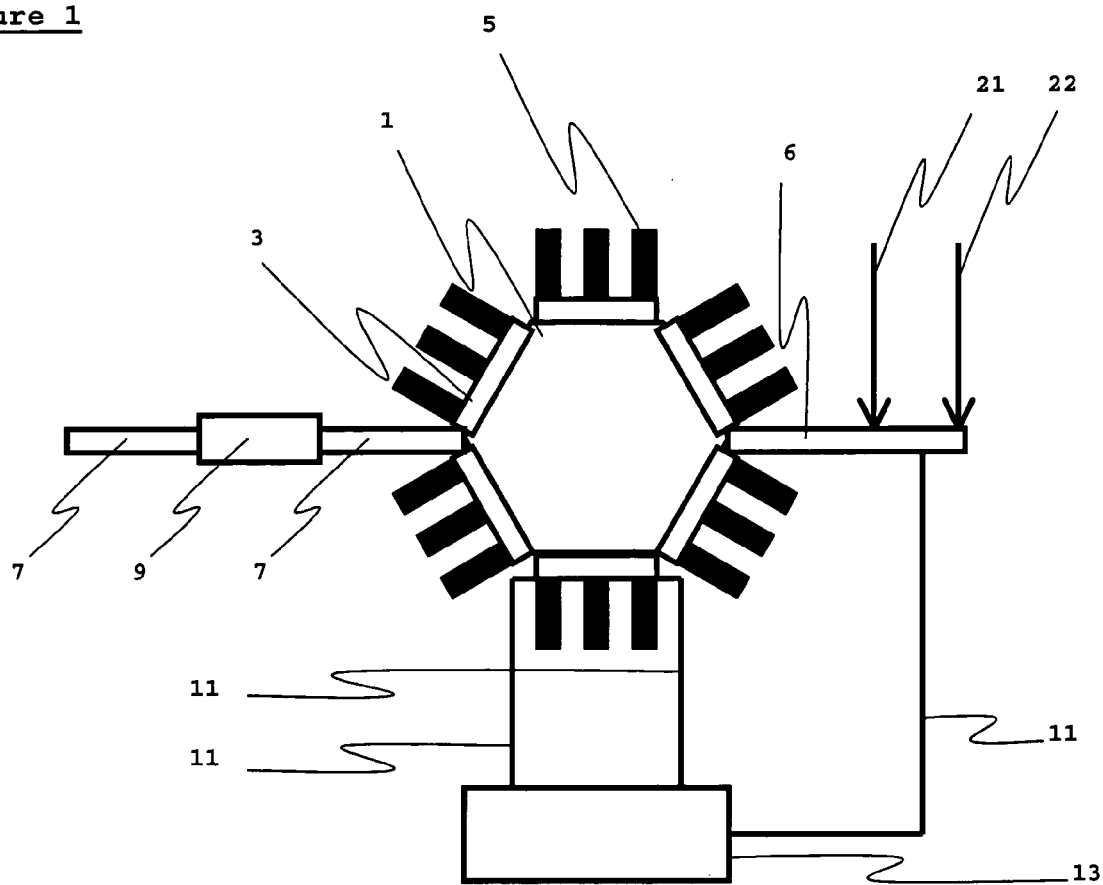
FIG. 1 is a schematic view of an electrical power unit according to the invention.

Embodiments of the present invention and their technical advantages may be better understood by referring to FIG. 1.

For purposes of illustration, the present invention is discussed with reference to standard thermionic converters. However, it is understood that the present invention may be used in conjunction with any thermionic device that acts to convert input heat energy to output electrical energy, including thermotunneling converters.

Furthermore, for purposes of illustration, the present invention is discussed with reference to vehicles, automobiles, and cars. However it is to be understood that any device that use the combustion of a fuel in an engine to output motive power, is within the scope of the present invention. Thus any kind of self-propelled vehicle, including military vehicles, locomotives, ships and aircraft are envisaged to be able to utilize the motive unit of the present invention.

Furthermore, for purposes of illustration, the present invention is discussed with reference to gasoline, diesel fuel and aviation fuel. However it is to be understood that any fuel may be utilized. Thus liquid fuels such as kerosene, alcohol, liquefied petroleum gases, liquid hydrogen and the like, gaseous fuels such as butane, other hydrocarbon gases, hydrogen, carbon monoxide and the like, and solid fuels such as coal, coke, wood and the like are considered to be within the scope of the present invention.

In accordance with a first embodiment of the present invention, an electrical power unit comprises a combustion chamber attached to one or more thermionic devices. As opposed to previous described usage of thermionic devices located close to exhaust heat, in the present invention such devices are located right next to the combustion chamber or combustion pipe, for drawing heat therefrom. Such a power unit may be utilized in a number of devices, such as instead of a diesel-powered generator to provide local, or a back-up, supply of electricity; as a power unit in a vehicle; or in a MEMS form, as a small, compact and efficient electrical supply.

Referring now to FIG. 1, which shows an electrical power unit of the present invention a combustion chamber 1 is provided and surrounded by one or more thermionic converters 3. These are not limited in number, and may comprise a single device adapted to surround the combustion chamber, or multiple thermionic converters 3 strategically placed around the chamber 1 for extracting as much heat therefrom as possible. Thermionic converters generate electricity from a temperature differential, and therefore require a hotter side and a colder side. In the present invention, the hot side of the thermionic converter is placed adjacent the combustion chamber 1 while the colder side is adjacent to heat sink 5. Again, the heat sink 5 may be a single device connected to all the thermionic converters 3, or a multiple of heat sink devices, or simply a cooling fluid.

To one side of the combustion chamber 1 is the intake/controller 6 for fuel 21 and air 22, which may comprise separate intake pathways, or a combined pathway, and could comprise means for compressing the fuel and/or the air. In one embodiment intake 6 may be a mechanical feed for solid fuel. Glow plugs, pilot lights, piezo-electric igniters or similar means for beginning the combustion are not shown. The main exit for the combusted fuel from the combustion chamber 1 is through the exhaust 7. Along the pathway of the exhaust 7 is positioned an optional catalytic converter 9, which provides for the catalytic conversion of nitrates from the exhaust fumes. However, other catalytic converters may not be necessary in the present invention because a lean burn environment may be provided for according to the method of the present invention, thus not creating hydrocarbons or similar emissions. Optionally, along the pathway of the exhaust 7 are secondary thermionic converters (not shown) for converting the remaining heat in the exhaust 7 into electricity.

The electrical output of the thermionic converters 3 is transferred via electrical leads 11 to an energy control system 13. The thermionic converters 3 may be arranged in series or in parallel to one another, depending on the voltage requirement: in series for high voltage, in parallel for low voltage, high current. The energy control system takes an input indicative of the electrical power output required, which may be from a human controller or from an associated control system. The energy control system controls the rate at which fuel and air is supplied to the combustion chamber.

In accordance with a second embodiment of the present invention, a motive unit comprises a combustion chamber attached to one or more thermionic devices, and drive means for converting electrical output of the thermionic converters into motive power for the wheels of a vehicle. As opposed to previous described usage of thermionic devices located close to exhaust heat, in the present invention such devices are located right next to the combustion chamber or combustion pipe, for drawing heat therefrom. Such a motive unit may be utilized in a number of devices, including land, sea and air vehicles.

Figure 2:
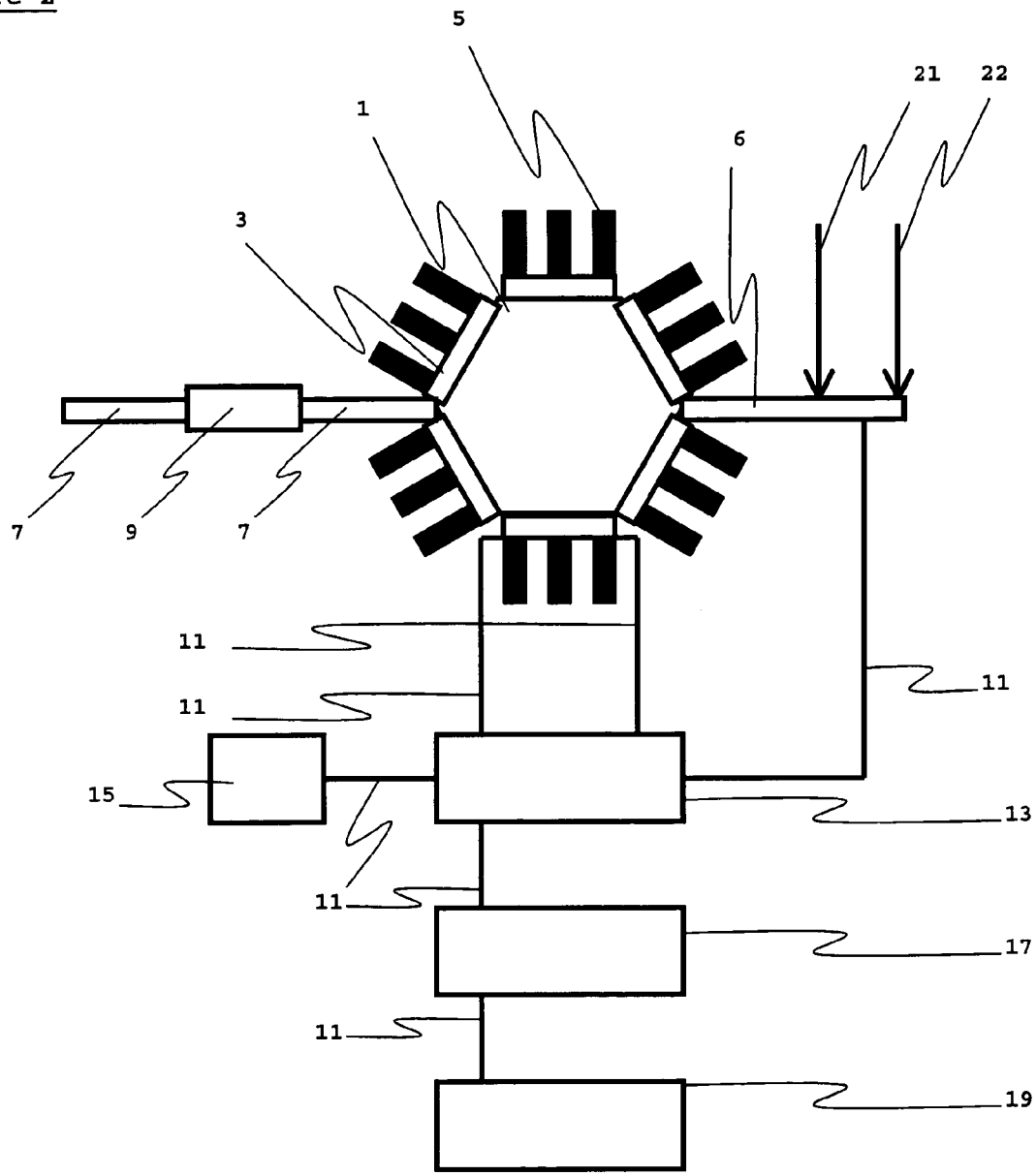
FIG. 2 is a schematic view of a motive unit according to the invention.

Referring now to FIG. 2, which shows a motive unit of the present invention, a combustion chamber 1 is provided and surrounded by one or more thermionic converters 3. These are not limited in number, and may comprise a single device adapted to surround the combustion chamber, or multiple thermionic converters 3 strategically placed around the chamber 1 for extracting as much heat therefrom as possible. Thermionic converters generate electricity from a temperature differential, and therefore require a hotter side and a colder side. In the present invention, the hot side of the thermionic converter is placed adjacent the combustion chamber 1 while the colder side is adjacent to heat sink 5. Again, the heat sink 5 may be a single device connected to all the thermionic converters 3, or a multiple of heat sink devices, or simply a cooling fluid.

To one side of the combustion chamber 1 is the intake/controller 6 for fuel 21 and air 22, which may comprise separate intake pathways, or a combined pathway, and could comprise means for compressing the fuel and/or the air. In one embodiment intake 6 may be a mechanical feed for solid fuel. Glow plugs, pilot lights, piezo-electric igniters or similar means for beginning the combustion are not shown. The main exit for the combusted fuel from the combustion chamber 1 is through the exhaust 7. Along the pathway of the exhaust 7 is positioned an optional catalytic converter 9, which provides for the catalytic conversion of nitrates from the exhaust fumes. However, other catalytic converters may not be necessary in the present invention because a lean burn environment may be provided for according to the method of the present invention, thus not creating hydrocarbons or similar emissions. Optionally, along the pathway of the exhaust 7 are secondary thermionic converters (not shown) for converting the remaining heat in the exhaust 7 into electricity.

The electrical output of the thermionic converters 3 is transferred via electrical leads 11 to an energy control system 13. The thermionic converters 3 may be arranged in series or in parallel to one another, depending on the voltage requirement: in series for high voltage, in parallel for low voltage, high current. The energy control system takes an input indicative of the desired speed of the electric motor, which may be from a human controller or from an associated control system. The energy control system controls the rate at which fuel and air is supplied to the combustion chamber and takes an input from the energy storage system 15, and from the drive state, which is representative of the demand for electrical power and correlates to: the desired speed of the electric motor; the load on the electric motor; and the amount of energy stored in the energy storage system. The energy control system 13 further allocates power to and from the energy storage system 15 as well as to the drive 17. The energy storage system 15 may comprise a battery, a flywheel, or the like.

The drive 17 comprises an electrical motor and a controller therefor. It may be any type of electrical motor, but a preferred type is one with many phases of electrical power (more than three phases), preferably with a different phase for each winding. The controller provides variable speed for the motor, and optionally provides for variable voltage too. The motor provides motive power to the wheels 19, according to the output of the controller.

In accordance with a third embodiment of the present invention, an auxiliary power unit comprises a combustion chamber attached to one or more thermionic devices. The auxiliary power unit may additionally comprise compressor means for converting electrical output of the thermionic converters into hydraulic power and bleed air, and suitable conditioning means to provide electrical power at the desired voltage and frequency. As opposed to previous described usage of thermionic devices located close to exhaust heat, in the present invention such devices are located right next to the combustion chamber or combustion pipe, for drawing heat therefrom. Such an auxiliary power unit may be utilized in a number of devices, including land, sea and air vehicles.

Figure 3:
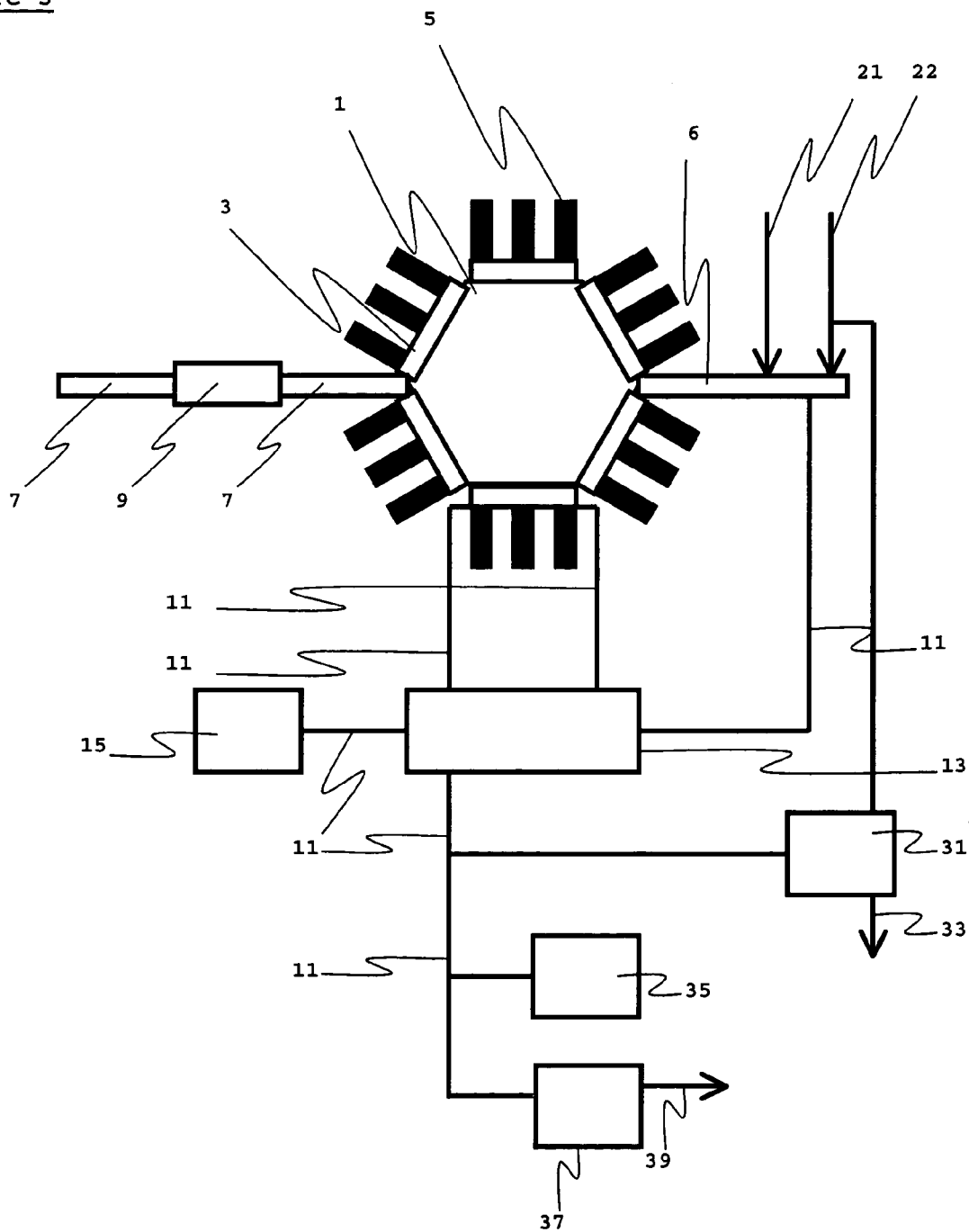
FIG. 3 is a schematic view of an auxiliary power unit according to the invention.

Referring now to FIG. 3, which shows an auxiliary power unit of the present invention, a combustion chamber 1 is provided and surrounded by one or more thermionic converters 3. These are not limited in number, and may comprise a single device adapted to surround the combustion chamber, or multiple thermionic converters 3 strategically placed around the chamber 1 for extracting as much heat therefrom as possible. Thermionic converters generate electricity from a temperature differential, and therefore require a hotter side and a colder side. In the present invention, the hot side of the thermionic converter is placed adjacent the combustion chamber 1 while the colder side is adjacent to heat sink 5. Again, the heat sink 5 may be a single device connected to all the thermionic converters 3, or a multiple of heat sink devices, or simply a cooling fluid.

To one side of the combustion chamber 1 is the intake/controller 6 for fuel 21 and air 22, which may comprise separate intake pathways, or a combined pathway, and could comprise means for compressing the fuel and/or the air. In one embodiment intake 6 may be a mechanical feed for solid fuel. Glow plugs, pilot lights, piezo-electric igniters or similar means for beginning the combustion are not shown. The main exit for the combusted fuel from the combustion chamber 1 is through the exhaust 7. Along the pathway of the exhaust 7 is positioned an optional catalytic converter 9, which provides for the catalytic conversion of nitrates from the exhaust fumes. However, other catalytic converters may not be necessary in the present invention because a lean burn environment may be provided for according to the method of the present invention, thus not creating hydrocarbons or similar emissions. Optionally, along the pathway of the exhaust 7 are secondary thermionic converters (not shown) for converting the remaining heat in the exhaust 7 into electricity.

The electrical output of the thermionic converters 3 is transferred via electrical leads 11 to an energy control system 13. The thermionic converters 3 may be arranged in series or in parallel to one another, depending on the voltage requirement: in series for high voltage, in parallel for low voltage, high current. The energy control system takes an input representative of the demand for electrical power from the one or more ancillary units and computes and controls the intake of fuel and air into the combustion chamber. The energy control system may also take an input from an energy storage system 15, which is representative of the demand for electrical power and correlates to the amount of energy stored in the energy storage system. The energy control system 13 further allocates power to and from the energy storage system 15. The energy storage system 15 could comprise a battery, a flywheel, or the like.

The energy control system provides electrical power to a range of units, and some of the common ones are shown in FIG. 3. An electrically powered compressor 31 compresses supply air 22 to generate compressed air 33 (for example, 3 bar for supplying the cabin air-conditioning system). An electrically powered compressor 35 may also be utilized to provide hydraulic power for aircraft systems. An electrical conditioning unit 37 may also be employed to provide electric energy (for example, 380 V/400 Hz for the on-board power supply).

This embodiment removes the need for a conventional turbine-powered generator unit, and converts directly energy released as heat in the combustion chamber into electricity.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The present invention also allows for several other features. For example, the present invention allows for vehicle air conditioning to be easily accommodated because the vehicle is operated on electrical power. In fact, the thermionic converters can completely replace the alternator used in the prior art. Extra control features over the drive and the wheels are also provided for with the present invention. Furthermore, generation of supplementary electricity when the vehicle is going downhill may be more easily converted to other useful electrical energy.

Some systems in a vehicle may continue to utilize thermal energy in the exhaust gases or from the heat sinks of the thermionic converters. For example, heat from the heat sinks may be used to heat water (for air conditioning or other purposes), or to power a convective pump. Alternatively, secondary thermionic converters could be situated to receive the output heat from the primary ones, and produce supplementary electrical power.

A preferred embodiment of the present invention includes the use of high temperature (such as in the 2000 Kelvin range) high efficiency thermionic converters. The base of the vehicle may act as the heat sink. Alternatively, the top of the sides of the vehicle could also act as the heat sink. Further, the vehicle may be designed to be shielded from the sun but allow passing wind to remove heat therefrom. Another embodiment of the present invention may allow the thermionic converter to operate with high enough efficiency to not require a dedicated heat sink.

The thermionic converters of the present invention may be solid state, comprising glass between the electrodes, and with all its component parts able to operate at high temperatures. The thermionic converters of the present invention further include devices described by Tavkhelidze (WO99/13562), which comprise: an emitter electrode, connected to the combustion chamber; a collector electrode, positioned sufficiently close to the emitter electrode for electrons to tunnel from the emitter electrode to the collector electrode; and manipulating means for controlling the relative electrode positioning, connected to one or both of said electrodes. The manipulating means may be piezo electric, electrostrictive, or magnetostrictive actuators. The thermionic converters of the present invention additionally include devices described by Tavkhelidze (U.S. Pat. No. 6,281,514) which comprise an elementary particle-emitting surface having an indented cross-section, in which the depth of the indents is given by the relationship $\lambda(1+2n)/4$, where $\lambda$ is the de Broglie wavelength for the elementary particle, and where n is 0 or a positive integer selected such that the geometric shape of the elementary particle-emitting surface causes de Broglie interference between said elementary particles so that said tunneling is promoted. The thermionic converters of the present invention additionally include devices comprising a first and a second electrode, each electrode having a surface for positioning facing the other electrode, wherein said surfaces are substantially flat and comprise matching topographical features to one another.

The thermionic converters may power a motor of a car, although it could be used for other uses too. A preferred motor to be used in conjunction with a thermionic converter is a multi-phased motor, having more than three phases, which is able to utilize more harmonics of the input power than a three phase motor is able to, such as in U.S. Pat. No. 6,054,837 to Edelson. Here a polyphase induction machine operated by an inverter drive system. The machine is constructed with concentrated full span windings. Twelve or more phases are used to sufficiently cover the air gap region, in contrast to the conventional three phases using distributed and chorded windings. Substantial efficiency and starting torque benefits are thereby obtained. According to Edelson's approach, an AC induction machine is operated by an inverter drive system. The improvement over the prior art is that the number of independently driven phases is increased to more than the conventional three, preferably to a number substantially greater than three, such as twelve phases or more. The stator is wound with little or no chording, and with little or no winding distribution, both allowing windings with fewer turns to be used. Thus resistance losses owing in the stator windings are reduced. Large machines with low pole counts are facilitated by the reduced winding distribution, again enhancing efficiency because low pole count machines are more efficient. Great control of stator magnetic field structure is possible, to the point that motor pole configuration may be changed purely electronically. Moreover, the present invention may be used with any type of motor.

The fuel in the combustion chamber, or pipe, may be introduced under high pressure to increase the efficiency of the fuel power. The pumping to perform this may come from electricity provided by the thermionic converters.

To maximize the heat output of combustion, a lean burn environment is allowed for. The present invention provides for hydrocarbons and carbon oxides to be fully combusted. A catalytic converter may be placed downstream of the combustion chamber to deal with the resultant nitrogen oxides.

A preferred embodiment of the present invention is in a car. However, the invention would be used in a golf cart, airplane, train, spacecraft, other vehicles, or other things commonly powered by engines.

The present invention further includes an energy storage medium for excess energy produced. This helps the vehicle at startup, for overload, to power secondary electrical devices in the vehicle, and the like. Such energy storage devices may include, but are not limited to, batteries, flywheels, and fuel cells.

Further, the present invention uses clean fuels, which produce little or no toxic fumes and byproducts. Alternatively, even vegetable oils may be used to provide the required heat and driving power. All types of fuels or other technologies that provide heat in a similar way to fuel may be used. In a preferred embodiment, the fuel is injected into the combustion chamber, and initial glow plug or starter plug power would be provided from a storage medium.

Additionally, the present invention may use photoelectric generators to convert energy from the sun into electrical energy. Photoelectric generators comprise two electrodes, one exposed to the sun, and the other more shaded, each having a low work function. With an appropriate vacuum, the photoelectric converter may convert sunlight (and potentially some heat also), directly into electrical power. This can be used as a supplementary source of electrical power for the vehicle and is particularly useful in an all-electrically powered vehicle. Alternatively, the photoelectric generators may be situated above the thermionic converters to provide power to cool the heat sink side of the thermionic converters, thereby increasing the efficiency of the thermionic converters. This would be particularly useful when the air temperature is hot-when the photoelectric generators provide the most power.

Though the invention has been described with reference to specific preferred embodiments thereof, many variations and modifications will immediately become apparent to those skilled in the art. In particular, any device that exchanges heat for electrical power may replace thermionic converters. Furthermore, the combustion chamber may be replaced with any other source of heat energy such as a chemical reactor. Also, the invention describes an end result of providing motive power to wheels; however, it may also be used to provide motive power to other elements, such as a conveyer belt.

While this invention has been described with reference to illustrative embodiments, it is to be understood that this description is not intended to be construed in a limiting sense. Modifications to and combinations of the illustrative embodiments will be apparent to persons skilled in the art upon reference to this description. It is to be further understood, therefore, that changes in the details of the embodiments of the present invention and additional embodiments of the present invention will be apparent to persons of ordinary skill in the art having reference to this description. It is contemplated that such changes and additional embodiments are within the spirit and true scope of the invention as claimed below.

The invention claimed is:

1. An electrical power unit comprising:
a combustion chamber, in which fuel is combusted to release heat; and
a thermionic converter, which converts said heat into electrical energy; and
an energy control system;
wherein said control system takes an input representative of the demand for electrical power and computes and controls the intake of fuel and air into said combustion chamber.

2. The electrical power unit of claim 1 wherein said thermionic converter is a thermotunneling converter.

3. The electrical power unit of claim 1 wherein said thermionic converter comprises low work function electrodes.

4. The electrical power unit of claim 1 additionally comprising a fuel intake, wherein said fuel intake is attached to said combustion chamber,
wherein said fuel intake comprises a compressor for compressing said fuel prior to its introduction to said combustion chamber, and wherein said compressor is controlled by said energy control system.

5. The electrical power unit of claim 1 additionally comprising an air intake, wherein said air intake is attached to said combustion chamber,
wherein said air intake comprises a compressor for compressing said air prior to its introduction to said combustion chamber, and wherein said compressor is controlled by said energy control system.

6. A motive unit comprising:
the electrical power unit of claim 1; and
an electric motor powered by said electrical energy;

wherein said input representative of the demand for electrical power correlates to: the desired speed of said electric motor; and to the load on said electric motor.

7. The motive unit of claim 6 wherein said thermionic converter is a thermotunneling converter.

8. The motive unit of claim 6 wherein said thermionic converter comprises low work function electrodes.

9. The motive unit of claim 6 wherein said electric motor is a multi-phase electric motor.

10. The motive unit of claim 6 additionally comprising a fuel intake, wherein said fuel intake is attached to said combustion chamber, wherein said fuel intake comprises a compressor for compressing said fuel prior to its introduction to said combustion chamber, and wherein said compressor is controlled by said energy control system.

11. The motive unit of claim 6 additionally comprising an air intake, wherein said air intake is attached to said combustion chamber, wherein said air intake comprises a compressor for compressing said air prior to its introduction to said combustion chamber, and wherein said compressor is controlled by said energy control system.

12. The motive unit of claim 6 additionally comprising an energy storage system, wherein electrical energy produced by said thermionic converter may be stored, wherein said energy storage system is selected from the group consisting of: an electrical battery, a flywheel, and a fuel cell, and wherein said input representative of the demand for electrical power correlates to: the desired speed of said electric motor; the load on said electric motor; and the amount of energy stored in said energy storage system.

13. The motive unit of claim 6 wherein said input representative of the demand for electrical power is provided by a throttle controlled by a human operator.

14. An automobile comprising the motive unit of claim 6 wherein said motor converts said electrical energy into rotational energy, wherein said rotational energy provides motive power to said automobile.

15. The automobile of claim 14 wherein said thermionic converter is a thermotunneling converter.

16. The automobile of claim 14 wherein said thermionic converter comprises low work function electrodes.

17. The automobile of claim 14 wherein said electric motor is a multi-phase electric motor.

18. The automobile of claim 14 additionally comprising a fuel intake, wherein said fuel intake is attached to said combustion chamber, wherein said fuel intake comprises a compressor for compressing said fuel prior to its introduction to said combustion chamber, and wherein said compressor is controlled by said energy control system.

19. The automobile of claim 14 additionally comprising an air intake, wherein said air intake is attached to said combustion chamber, wherein said air intake comprises a compressor for compressing said air prior to its introduction to said combustion chamber, and wherein said compressor is controlled by said energy control system.

20. The automobile of claim 14 additionally comprising an energy storage system, wherein electrical energy produced by said thermionic converter may be stored, wherein said energy storage system is selected from the group consisting of: an electrical battery, a flywheel, and a fuel cell, and wherein said input representative of the demand for electrical power correlates to: the desired speed of said electric motor; the load on said electric motor; and the amount of energy stored in said energy storage system.

21. The automobile of claim 14 wherein said input representative of the demand for electrical power is provided by a throttle controlled by a human operator.

22. The automobile of claim 14 additionally comprising an energy recovery system, whereby electrical energy is recovered when said automobile is undergoing braking or when said automobile is traveling down an incline,
and wherein said energy recovery system is selected from the group consisting of: an electrical battery, a flywheel, and a fuel cell.

23. An auxiliary power unit comprising: the electrical power unit of claim 1;
and one or more ancillary units, wherein said one or more ancillary units are selected from the group consisting of: a conditioning means to provide electrical energy at the required voltage and frequency, an electrical compressor means powered by the electrical energy for providing bleed air, and an electrical compressor means powered by the electrical energy for providing hydraulic power; wherein said energy control system takes an input representative of the demand for electrical power from said one or more ancillary units and computes and controls the intake of fuel and air into the combustion chamber.

24. The auxiliary power unit of claim 23 wherein said thermionic converter is a thermotunneling converter.

25. The auxiliary power unit of claim 23 wherein said thermionic converter comprises low work function electrodes.

26. The auxiliary power unit of claim 23 additionally comprising a fuel intake, wherein said fuel intake is attached to said combustion chamber,
wherein said fuel intake comprises a compressor for compressing said fuel prior to its introduction to said combustion chamber, and wherein said compressor is controlled by said energy control system.

27. The auxiliary power unit of claim 23 additionally comprising an air intake, wherein said air intake is attached to said combustion chamber,
wherein said air intake comprises a compressor for compressing said air prior to its introduction to said combustion chamber, and wherein said compressor is controlled by said energy control system.

28. The auxiliary power unit of claim 23 additionally comprising an energy storage system, wherein said energy storage system is selected from the group consisting of: an electrical battery, a flywheel, and a fuel cell,
wherein electrical energy produced by said thermionic converter may be stored, and wherein said input representative of the demand for electrical power additionally correlates to the amount of energy stored in said energy storage system.

29. An aircraft comprising the auxiliary power unit of claim 23 wherein said auxiliary power unit provides one or more services to the aircraft,
wherein said one or more services are selected from electrical power, bleed air and hydraulic power.

* * * * *